UNITED STATES PATENT OFFICE.

JAY FRANK SCHAMBERG AND GEORGE W. RAIZISS, OF PHILADELPHIA, PENNSYLVANIA, ASSIGNORS TO DERMATOLOGICAL RESEARCH LABORATORIES, OF PHILADELPHIA, PENNSYLVANIA, A CORPORATION OF PENNSYLVANIA.

MEDICINAL COMPOUND AND METHOD OF PRODUCING THE SAME.

1,417,771.  Specification of Letters Patent.  Patented May 30, 1922.

No Drawing.  Application filed April 21, 1920.  Serial No. 375,433.

*To all whom it may concern:*

Be it known that we, JAY FRANK SCHAMBERG and GEORGE W. RAIZISS, citizens of the United States, residing in the city of Philadelphia, State of Pennsylvania, have jointly invented a certain new and useful Medicinal Compound and Method of Producing the Same, of which the following is a full, clear, and exact description.

Our invention relates to a new chemical body having special utility for the treatment of skin diseases, including psoriasis, a somewhat prevalent disease, heretofore treated by local applications of the pharmaceutical compound called chrysarobin as the best known local remedy, as to which our new product is much superior as determined by reports from physicians through whom we have fully tested its therapeutic effects. Our invention is also comprehensive of a novel method of producing the new product.

In carrying out our process, in the production of the new body, we use as a starting material the aforesaid well known compound chrysarobin, and although samples of it show minor and immaterial variations in the composition, all of them answer when purified, to the empiric formula $C_{30}H_{26}O_7$, and consist of an amorphous powder, yellow in color, having a melting point, before purification, of 145° to 155° C., insoluble in water, but readily soluble in chloroform, acetic acid and benzene, and derived from thoroughly boiling goa or araroba powder with benzene or chloroform to obtain an exhaustive extraction and evaporating the solution to dryness.

From this body as a basis we produce our new product by a new method or process, of which the following is a practical example: The chrysarobin is dissolved by boiling in glacial acetic acid, for which purpose 40 grams of the chrysarobin and 20 grams of tin metal are suspended in 600 c. c. glacial acetic acid, in a suitable flask, and after being brought to boiling for about 15 minutes the chrysarobin will be dissolved, whereupon 25 c. c. as a maximum, of concentrated hydrochloric acid are added to the chrysarobin solution, drop by drop from a separatory funnel; the boiling then continued for about 40 minutes when about 25 c. c. additional of H. Cl. are added in like manner, followed by a further boiling for about another 40 minutes, and an additional 25 c. c. about of H. Cl. then added in like manner as before. Sometimes however, as we have discovered with some samples of chrysarobin, an aggregrate of H. Cl. exceeding 55 to 60 c. c. will produce a precipitate which should be avoided.

The boiling is then continued for about an hour and a half and ten grams of charcoal introduced near the end of that period; after which the hot solution is filtered to free it from undissolved metal, charcoal and other impurities.

The filtrate is then crystallized by cooling, first by rapidly stirring and then allowing it to stand for an hour or two in the cold, whereupon the precipitate is deprived of all traces of acetic acid by successive washings first with water and then, if need be, with cautious use of ethyl alcohol and ether, as in both of these last named reagents it is slightly soluble, and hence liable to diminish the quality and yield, which should be from 25 to 30 grams from the quantities first above stated.

The product is subject to deterioration from the action of light and moisture, and hence is best preserved in stoppered and amber colored glass bottles or evacuated ampoule. The finished product is in the form of very small crystals, yellow in color, having a melting point of 190 C. though a slight decomposition will ordinarily begin at 170 C., slightly soluble in or absorbent of moisture, more readily soluble in ethyl alcohol, somewhat less so in methyl alcohol and ether, and easily soluble in chloroform.

Having thus described our invention, we claim:

1. The new medicinal product described, which is the reduced derivative of an extract of araroba powder, is minutely crystalline in form, yellow in color, melting at about 190° C., slightly soluble in ether and methyl alcohol, and more soluble in glacial acetic acid, chloroform, benzene and ethyl alcohol.

2. The process described, of producing the reduced derivative of an extract of araroba powder, which consists in subjecting an acetic acid and tin metal solution of said extract to the prolonged action of hydrochloric acid at a boiling temperature, filtering the same and crystallizing the precipitate.

3. The process described which consists in dissolving the amorphous powder extract of araroba powder in acetic acid, in the presence of tin metal, at a boiling temperature, subjecting the solution to the repeated action of hydrochloric acid at a prolonged boiling temperature, filtering the same, washing the fitrate for the complete removal of acetic acid, and finally cooling the residue for the separating out of the crystalline precipitate.

In testimony whereof, we have hereunto affixed our signatures this 16th day of April, A. D. 1920.

JAY FRANK SCHAMBERG.
GEORGE W. RAIZISS.

Witnesses:
   I. M. TUNIS,
   ALEXANDER PARK.